(12) United States Patent
Sato

(10) Patent No.: US 7,472,024 B2
(45) Date of Patent: Dec. 30, 2008

(54) DATA ANALYSIS APPARATUS AND METHOD

(75) Inventor: Makoto Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/858,357

(22) Filed: Sep. 20, 2007

(65) Prior Publication Data

US 2008/0162081 A1 Jul. 3, 2008

(30) Foreign Application Priority Data

Dec. 27, 2006 (JP) ............................. 2006-352016

(51) Int. Cl.
*G01H 17/00* (2006.01)
(52) U.S. Cl. .................. 702/34; 702/179; 702/183; 702/184; 700/79; 700/109; 340/511; 706/912
(58) Field of Classification Search ................ 702/182, 702/34, 179, 84, 183, 184; 700/83, 79, 108, 700/109, 49, 2, 6, 20, 21, 31; 340/511; 714/769, 714/802, 815; 706/912
See application file for complete search history.

(56) References Cited

U.S. PATENT DOCUMENTS

| | | | | |
|---|---|---|---|---|
| 5,210,704 A | * | 5/1993 | Husseiny | 702/34 |
| 5,566,092 A | * | 10/1996 | Wang et al. | 702/185 |
| 5,602,761 A | * | 2/1997 | Spoerre et al. | 702/179 |
| 5,978,717 A | * | 11/1999 | Ebersohn et al. | 701/19 |
| 7,206,646 B2 | * | 4/2007 | Nixon et al. | 700/83 |
| 2003/0005486 A1 | * | 1/2003 | Ridolfo et al. | 800/288 |
| 2005/0038579 A1 | * | 2/2005 | Lewis | 701/29 |
| 2005/0179537 A1 | * | 8/2005 | Lewis | 340/506 |
| 2005/0288812 A1 | * | 12/2005 | Cheng et al. | 700/109 |

FOREIGN PATENT DOCUMENTS

| | | |
|---|---|---|
| JP | 2002149868 | 5/2002 |
| JP | 2004145496 | 5/2004 |
| JP | 2005296321 | 10/2005 |

* cited by examiner

*Primary Examiner*—Carol S Tsai
(74) *Attorney, Agent, or Firm*—Amin, Turocy & Calvin, LLP

(57) ABSTRACT

There is provided with a data analysis method, including: providing a database storing for each of devices an example that includes inspection time, the degradation level, operation characteristics, and replacement information; providing a evaluation maintenance strategy including an evaluative inspection time, an evaluation time and evaluative replacement condition; providing a prediction model for predicting the degradation level of a device from operation characteristics thereof; estimating by using the database an estimated number of devices that have already been replaced before the evaluation time, evaluating the degradation level at the evaluative inspection time of each of as many devices as estimated number and devices subjected to inspection of same periodic inspection time as the evaluation time; and evaluating the degradation level at the evaluation time of devices whose degradation level at the evaluation inspection time does not satisfy the replacement condition.

13 Claims, 16 Drawing Sheets

<RESULT OF 2006 PERIODIC INSPECTION>

| DEVICE ID | NUMBER OF ACTIVATIONS | ACTIVATION DURATION | INSTALLATION YEAR | DEGRADATION LEVEL | RESULT |
|---|---|---|---|---|---|
| 1 | 1800 | 2500 | 2003 | 0.50 | REPLACED |
| 2 | 300 | 2000 | 2003 | 0.30 | GOOD |
| 3 | 2000 | 2500 | 2003 | 0.35 | GOOD |
| 4 | 500 | 2200 | 2004 | 0.50 | REPLACED |
| 5 | 2000 | 3000 | 2004 | 0.55 | REPLACED |
| 6 | 300 | 1000 | 2004 | 0.20 | GOOD |
| 7 | 500 | 2000 | 2004 | 0.20 | GOOD |
| 8 | 1500 | 1000 | 2004 | 0.20 | GOOD |
| 9 | 800 | 1200 | 2004 | 0.30 | GOOD |
| 10 | 300 | 800 | 2004 | 0.10 | GOOD |
| 11 | 1000 | 3000 | 2004 | 0.40 | GOOD |
| 12 | 500 | 800 | 2005 | 0.55 | REPLACED |
| 13 | 700 | 500 | 2005 | 0.20 | GOOD |
| 14 | 300 | 1000 | 2005 | 0.20 | GOOD |

FIG. 7

| DEVICE ID | NUMBER OF ACTIVATIONS | ACTIVATION DURATION | INSPECTION YEAR | DEGRADATION LEVEL | RESULT |
|---|---|---|---|---|---|
| 1 | 600 | 300 | 1 | 0.05 | GOOD |
| 1 | 1150 | 650 | 2 | 0.15 | GOOD |
| 1 | 1400 | 920 | 3 | 0.30 | GOOD |
| | | ⋮ | | | |
| 7 | 300 | 600 | 1 | 0.30 | GOOD |
| 7 | 650 | 1250 | 2 | 0.55 | REPLACE |
| 8 | 500 | 600 | 1 | 0.35 | GOOD |
| 8 | 1050 | 1300 | 2 | 0.80 | REPLACE |

<DATA MAINTENANCE STRATEGY>
INSPECTION TIME: FIRST, SECOND AND THIRD YEAR
REPLACEMENT CONDITION: DEGRADATION LEVEL IS
0.5 OR HIGHER

<EVALUATION MAINTENANCE STRATEGY>
EVALUATIVE INSPECTION TIME: 2.5TH YEAR
EVALUATIVE REPLACEMENT CONDITION: DEGRADATION LEVEL IS
0.55 OR HIGHER
EVALUATION TIME: THIRD YEAR

FIG. 10

EXAMPLE OUTPUT AT 403

| DEVICE ID | NUMBER OF ACTIVATIONS | ACTIVATION DURATION | TIME | DEGRADATION LEVEL | NUMBER OF CASE EXAMPLES TO BE GENERATED | INDIVIDUAL VARIABILITY COEFFICIENT |
|---|---|---|---|---|---|---|
| 1 | 1800 | 2500 | 3RD YEAR | 0.50 | 1 | 0.28 |
| 2 | 300 | 2000 | 3RD YEAR | 0.30 | 1 | 0.32 |
| 3 | 2000 | 2500 | 3RD YEAR | 0.35 | 1 | -0.11 |
| 4 | 500 | 2200 | 2ND YEAR | 0.50 | 1 | 0.67 |
| 12 | 500 | 800 | 1ST YEAR | 0.55 | 2 | 0.87 |

FIG. 15

EXAMPLE OUTPUT AT 404

| DEVICE ID | NUMBER OF ACTIVATIONS | ACTIVATION DURATION | TIME | DEGRADATION LEVEL | NUMBER OF CASE EXAMPLES TO BE GENERATED | INDIVIDUAL VARIABILITY COEFFICIENT |
|---|---|---|---|---|---|---|
| 1 | 1800 | 2500 | 3RD YEAR | 0.50 | 1 | 0.28 |
| 2 | 300 | 2000 | 3RD YEAR | 0.30 | 1 | 0.32 |
| 3 | 2000 | 2500 | 3RD YEAR | 0.35 | 1 | -0.11 |
| 4 | 500 | 2200 | 2ND YEAR | 0.50 | 1 | 0.67 |
| 12-a | 500 | 800 | 1ST YEAR | 0.55 | 1 | 0.90 |
| 12-b | 500 | 800 | 1ST YEAR | 0.55 | 1 | 0.85 |

FIG. 16

<VIRTUAL CASE EXAMPLE>

| DEVICE ID | THE NUMBER OF ACTIVATIONS | ACTIVATION DURATION | TIME | DEGRADATION LEVEL | INDIVIDUAL VARIABILITY COEFFICIENT |
|---|---|---|---|---|---|
| 1 | 1800 | 2500 | 3RD YEAR | 0.50 | 0.28 |
| 2 | 300 | 2000 | 3RD YEAR | 0.30 | 0.32 |
| 3 | 2000 | 2500 | 3RD YEAR | 0.35 | -0.11 |
| 4 | 750 | 3300 | 3RD YEAR | 0.59 | 0.67 |
| 12-a | 1500 | 2400 | 3RD YEAR | 0.88 | 0.90 |
| 12-b | 1500 | 2400 | 3RD YEAR | 0.84 | 0.85 |
| 1 | 1500 | 2050 | 2.5TH YEAR | 0.47 | 0.28 |
| 2 | 250 | 1650 | 2.5TH YEAR | 0.28 | 0.32 |
| 3 | 1650 | 2050 | 2.5TH YEAR | 0.32 | -0.11 |
| 4 | 600 | 2750 | 2.5TH YEAR | 0.54 | 0.67 |
| 12-a | 1250 | 2000 | 2.5TH YEAR | 0.82 | 0.90 |
| 12-b | 1250 | 2000 | 2.5TH YEAR | 0.78 | 0.85 |

FIG. 17

<EVALUATION CASE EXAMPLE>

| DEVICE ID | THE NUMBER OF ACTIVATIONS | ACTIVATION DURATION | TIME | DEGRADATION LEVEL | INDIVIDUAL VARIABILITY COEFFICIENT |
|---|---|---|---|---|---|
| 1 | 1800 | 2500 | 3RD YEAR | 0.50 | 0.28 |
| 2 | 300 | 2000 | 3RD YEAR | 0.30 | 0.32 |
| 3 | 2000 | 2500 | 3RD YEAR | 0.35 | −0.11 |
| 4 | 750 | 3300 | 3RD YEAR | 0.59 | 0.67 |

FIG. 18

DATA ANALYSIS APPARATUS AND METHOD

CROSS-REFERENCE TO RELATED APPLICATIONS

This application is based upon and claims the benefit of priority from the prior Japanese Patent Applications No. 2006-352016 filed on Dec. 27, 2006, the entire contents of which are incorporated herein by reference.

BACKGROUND OF THE INVENTION

1. Field of the Invention

The present invention relates to a data analysis apparatus and a data analysis method for evaluating a maintenance strategy for a plurality of devices.

2. Related Art

Some of devices operating in various environments are regularly inspected by maintenance persons for state of degradation and the results of such device inspections are accumulated as electronic data. By analyzing data obtained from periodic inspections, it is possible to optimize a maintenance strategy, such as to predict future degradation and decide appropriate timing of replacement.

Optimization of the maintenance strategy includes optimization of timing for replacing individual devices as well as a viewpoint of optimizing global maintenance strategy, such as the interval of periodic inspections of devices and/or criteria for device replacement. Optimization of the latter requires data analysis for estimating how safety will change if a maintenance strategy which is different from one implemented at the time of data collection is implemented.

The invention disclosed in JP-A 2005-296321 (Kokai) that relates to an inspection apparatus and inspection method for fire facilities shows an analysis method for periodic inspection data for predicting degradation of devices based on results of periodic inspections of fire facilities and deciding an appropriate time to replace each of the devices. However, the invention does not show a data analysis method for optimizing periodic inspection times and the like by use of periodic inspection data obtained.

Periodic inspection data is accumulated by maintenance persons in accordance with a certain maintenance strategy (e.g., time of inspection and/or conditions for replacement). It is sometimes desired to analyze accumulated periodic inspection data to predict what happens if the initial inspection is delayed by half a year, for example. If the maintenance cost and/or safety of the current maintenance strategy can be calculated by analyzing obtained data and those of a strategy which delays the initial inspection by half a year can also be calculated, it is possible to determine which one of the strategies is preferable, which can lead to optimization of the maintenance strategy.

That is, it is required to realize evaluation of a maintenance strategy that is different from one which was implemented at the time of data collection. Such analysis is difficult in that a valid result cannot be obtained unless the fact is considered that devices which have been replaced in an inspection under a maintenance strategy under which data was collected may exist without being replaced under a maintenance strategy to be evaluated. It is accordingly required to evaluate a maintenance strategy taking into consideration case examples of devices that have been replaced under a maintenance strategy under which data was collected.

SUMMARY OF THE INVENTION

According to an aspect of the present invention, there is provided with a data analysis apparatus for evaluating a maintenance strategy for a plurality of devices, comprising:

a database configured to store first case examples of the devices, each including
- inspection time information which indicates an inspection for which of a plurality of periodic inspection times has been performed,
- a degradation level of the device,
- operation characteristics of the device, and
- replacement information indicating whether the device should be replaced or not;

a maintenance strategy storage configured to store a evaluation maintenance strategy including
- an evaluative inspection time which indicates a time at which a periodic inspection should be conducted instead of the plurality of periodic inspection times,
- an evaluation time indicating a time at which degradation of the devices is to be evaluated and which is later than the evaluative inspection time, in a case that the periodic inspection is conducted at the evaluative inspection time instead of the plurality of periodic inspection times, and
- a replacement condition indicating a condition for replacing the device based on the degradation level of the device;

a degradation prediction model storage configured to store a degradation prediction model for predicting the degradation level of the device from the operation characteristics of the device;

a base case example selector configured to select base case examples which are first case examples whose periodic inspection time precedes the evaluation time and having the replacement information indicating that the replacement should be conducted;

a case example generation and selection unit configured to
- estimate by using the database an estimated number of devices that have already been replaced before the evaluation time to not exist in the database, obtain the degradation level at the evaluative inspection time of each of as many devices as the estimated number by using at least the former of the base case examples and the degradation prediction model, and generate first virtual case examples including the degradation level at the evaluation time of devices whose obtained degradation level at the evaluative inspection time does not meet the replacement condition based on the base case examples and the degradation prediction model,
- calculate the degradation level at the evaluative inspection time of devices whose first case example have same periodic inspection time as the evaluation time from the first case examples of those devices and the degradation prediction model, and select first case examples of devices whose degradation level at the evaluative inspection time does not meet the replacement condition; and an evaluator configured to evaluate the evaluation maintenance strategy by using generated first virtual case examples and selected first case examples.

According to an aspect of the present invention, there is provided with a data analysis apparatus for evaluating a maintenance strategy for a plurality of devices, comprising:

a database configured to store one or more second case examples of each of the devices, each including
  inspection time information which indicates an inspection for which of a plurality of periodic inspection times has been performed,
  the degradation level of the device,
  operation characteristics of the device, and
  replacement information indicating whether the device should be replaced or not;
a maintenance strategy storage configured to store a evaluation maintenance strategy including
  an evaluative inspection time which indicates a time at which a periodic inspection should be conducted instead of the plurality of periodic inspection times,
  an evaluation time indicating a time at which degradation of the devices is to be evaluated and which is later than the evaluative inspection time, in a case that the periodic inspection is conducted at the evaluative inspection time instead of the plurality of periodic inspection times, and
  a replacement condition indicating a condition for replacing the device based on the degradation level of the device;
a degradation prediction model storage configured to store a degradation prediction model for predicting the degradation level of the device from the operation characteristics of the device;
a case example generation and selection unit configured to
  obtain the degradation level at the evaluative inspection time for each device whose second case example has a periodic inspection time which precedes the evaluation time and having replacement information indicating that the replacement should be conducted, by using at least the former of the second case example of each device and the degradation prediction model, and generate second virtual case examples each including the degradation level at the evaluation time for the device whose obtained degradation level at the evaluative inspection time does not meet the replacement condition based on the second case example of the device and the degradation prediction model,
  calculate the degradation level at the evaluative inspection time for each device that have same periodic inspection time as the evaluation time by using at least former of the second case example of the devices and the degradation prediction model, and select the second case example having same periodic inspection time as the evaluation time from among second case examples of each device whose calculated degradation level at the evaluative inspection time does not meet the replacement condition; and
an evaluator configured to evaluate the evaluation maintenance strategy by using generated second virtual case examples and selected second case examples.

According to an aspect of the present invention, there is provided with a data analysis method, comprising:
  providing a database configured to store for each of a plurality of devices a first case example that includes
    inspection time information which indicates an inspection for which of a plurality of periodic inspection times has been performed,
    a degradation level of the device,
    operation characteristics of the device, and
    replacement information indicating whether the device should be replaced or not; providing a evaluation maintenance strategy including
      an evaluative inspection time which indicates a time at which a periodic inspection should be conducted instead of the plurality of periodic inspection times,
      an evaluation time indicating a time at which degradation of the devices is to be evaluated and which is later than the evaluative inspection time, in a case that the periodic inspection is conducted at the evaluative inspection time instead of the plurality of periodic inspection times, and
      a replacement condition indicating a condition for replacing the device based on the degradation level of the device;
  providing a degradation prediction model for predicting the degradation level of the device from the operation characteristics of the device;
  selecting base case examples which are first case examples whose periodic inspection time precedes the evaluation time and having the replacement information indicating that the replacement should be conducted;
  estimating by using the database an estimated number of devices that have already been replaced before the evaluation time to not exist in the database, obtain the degradation level at the evaluative inspection time of each of as many devices as the estimated number by using at least the former of the base case examples and the degradation prediction model, and generate first virtual case examples including the degradation level at the evaluation time of devices whose obtained degradation level at the evaluative inspection time does not meet the replacement condition based on the base case examples and the degradation prediction model,
  calculating the degradation level at the evaluative inspection time of devices whose first case example have same periodic inspection time as the evaluation time from the first case examples of those devices and the degradation prediction model, and select first case examples of devices whose degradation level at the evaluative inspection time does not meet the replacement condition; and
  evaluating configured to evaluate the evaluation maintenance strategy by using generated first virtual case examples and selected first case examples.

According to an aspect of the present invention, there is provided with a data analysis method, comprising:
  providing a database configured to store for each of a plurality of devices one or more second case examples each including
    inspection time information which indicates an inspection for which of a plurality of periodic inspection times has been performed,
    the degradation level of the device,
    operation characteristics of the device, and
    replacement information indicating whether the device should be replaced or not; providing a evaluation maintenance strategy including
      an evaluative inspection time which indicates a time at which a periodic inspection should be conducted instead of the plurality of periodic inspection times,
      an evaluation time indicating a time at which degradation of the devices is to be evaluated and which is later than the evaluative inspection time, in a case that the periodic inspection is conducted at the evaluative inspection time instead of the plurality of periodic inspection times, and
      a replacement condition indicating a condition for replacing the device based on the degradation level of the device;
  providing a degradation prediction model for predicting the degradation level of the device from the operation characteristics of the device;

obtaining the degradation level at the evaluative inspection time for each device whose second case example has a periodic inspection time which precedes the evaluation time and having replacement information indicating that the replacement should be conducted, by using at least the former of the second case example of each device and the degradation prediction model, and generating second virtual case examples each including the degradation level at the evaluation time for the device whose obtained degradation level at the evaluative inspection time does not meet the replacement condition based on the second case example of the device and the degradation prediction model, calculating the degradation level at the evaluative inspection time for each device that have same periodic inspection time as the evaluation time by using at least former of the second case example of the devices and the degradation prediction model, and selecting the second case example having same periodic inspection time as the evaluation time from among second case examples of each device whose calculated degradation level at the evaluative inspection time does not meet the replacement condition; and evaluating the evaluation maintenance strategy by using generated second virtual case examples and selected second case examples.

BRIEF DESCRIPTION OF THE DRAWINGS

FIG. 7 illustrates a first example of a periodic inspection database;

FIG. 8 illustrates a second example of a periodic inspection database;

FIG. 9 shows an example of a data maintenance strategy;

FIG. 10 shows an example of an evaluation maintenance strategy;

FIG. 15 shows an example of output at step 403 of FIG. 5;

FIG. 16 shows an example of output at step 404 of FIG. 5;

FIG. 17 shows examples of virtual case examples;

FIG. 18 shows examples of evaluation case examples; and

DETAILED DESCRIPTION OF THE INVENTION

An embodiment of the present invention will be described below with respect to drawings.

Figure 1:
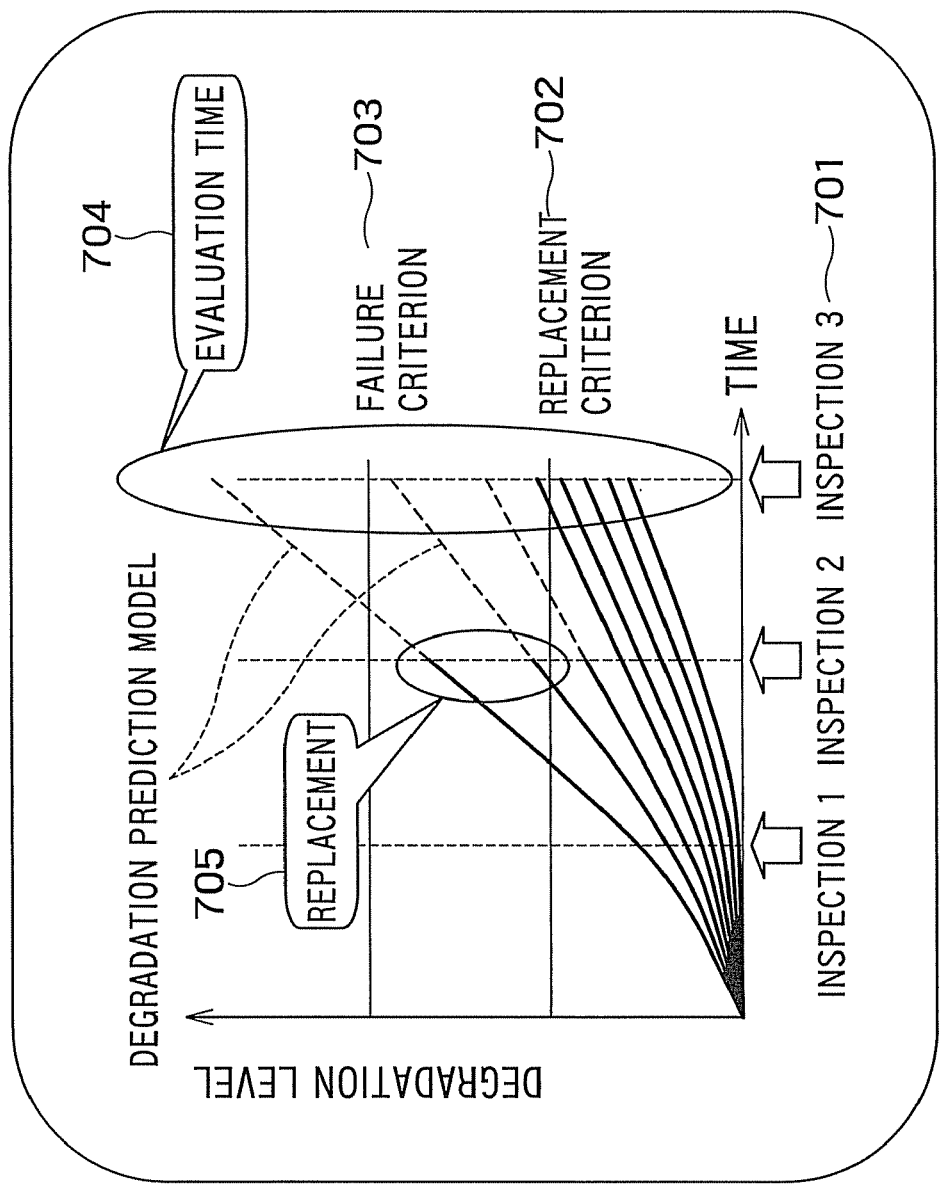
FIG. 1 illustrates an analysis problem with periodic inspection data involved in an embodiment of the present invention.

FIG. 1 illustrates an example of device degradation for an analysis problem addressed by the present invention. The horizontal axis of the graph represents time since installation of devices and the vertical axis represents degradation levels of the devices. One line graph represents degradation of one device and degradation proceeds with elapse of time, but individual variability occurs in degradation levels depending on operation conditions and/or initial quality. Arrows 701 present on the time axis represent times of periodic inspections, three inspection times being indicated. A value 702 present on the degradation axis represents the criterion for replacement (or a replacement condition) included in a maintenance strategy and a device exhibiting a degradation level equal to or higher than the criterion at the time of a periodic inspection should be replaced. A failure criterion 703 (e.g., 1.0) is set above the replacement criterion and degradation in excess of this criterion will cause troubles in device operation.

When such data on device degradation is accumulated in a periodic inspection database, to determine the average value of device degradation at the time of inspection 3 as the evaluation time 704 under the current maintenance strategy, for example, the average of values of solid-line graphs at the time of inspection 3 should be determined. However, assuming that inspection 2 was omitted, caution has to be exercised when the average of device degradation at the time of inspection 3, which is the evaluation time 704, is to be determined. That is, if inspection 2 was omitted, case examples of devices that were replaced in replacement 705 are present at the time of evaluation but those case examples are not present in data. Accordingly, to determine the average value of device degradation when inspection 2 was omitted, it is required to determine the average of the values of solid-line graphs and that of values of dotted-line graphs at the time of evaluation.

How to handle a case example of a replaced device as illustrated above is a challenge when device degradation is analyzed for a maintenance strategy that is different from one under which data was collected with periodic inspection data for devices which involve replacement.

Figure 2:
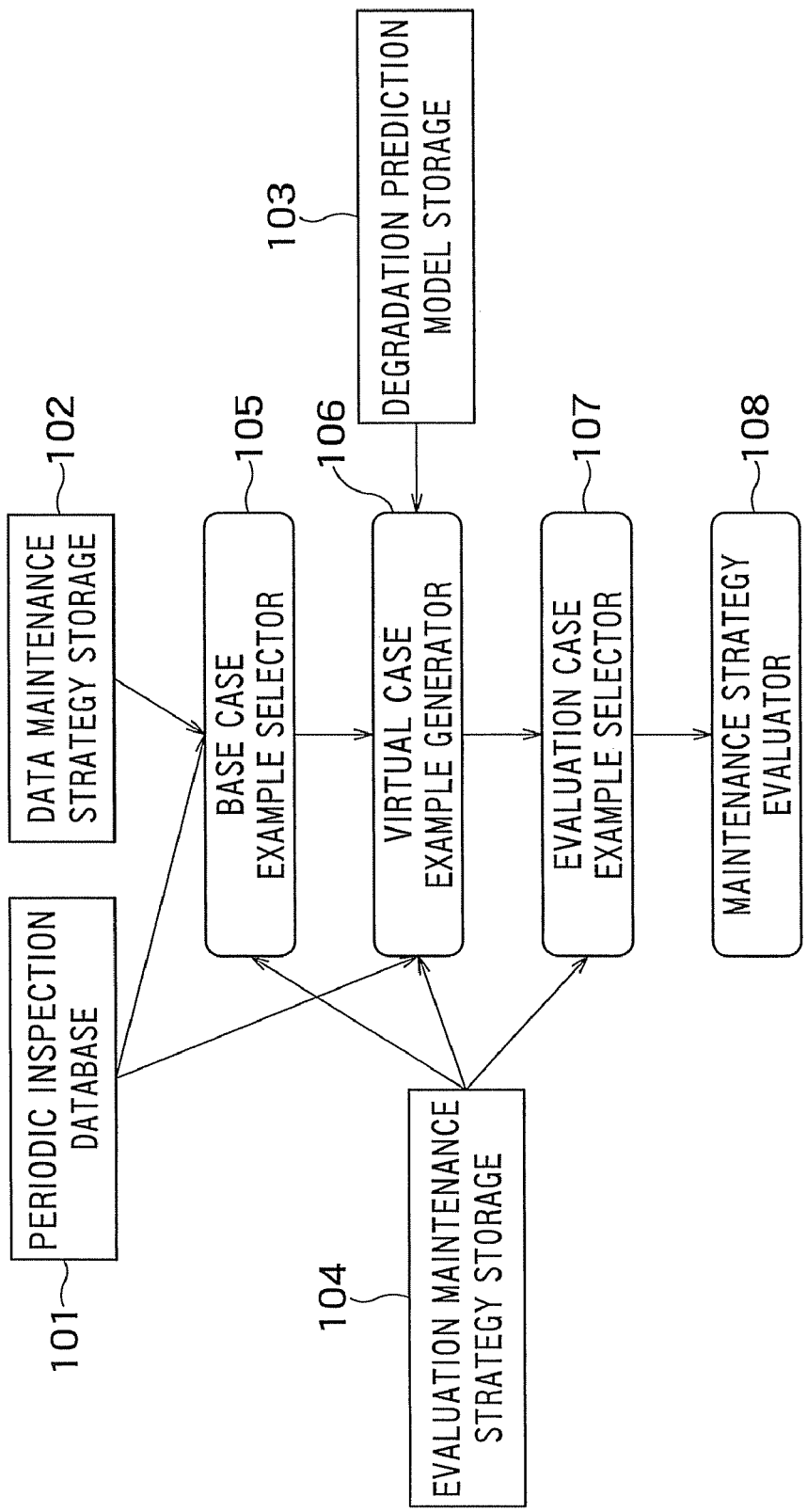
FIG. 2 shows a configuration of the periodic inspection data analysis apparatus according to an embodiment of the invention.
Figure 19:
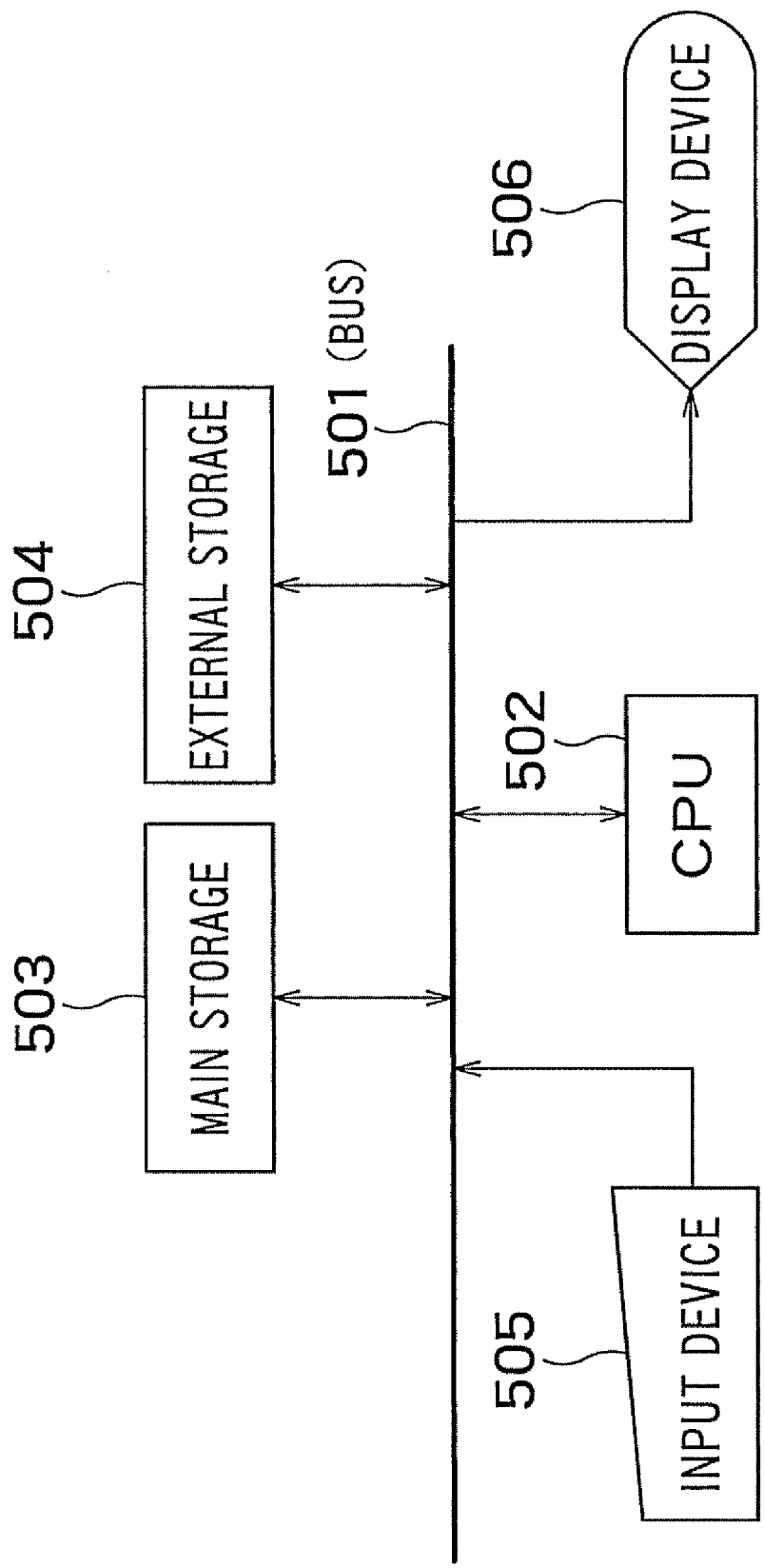
FIG. 19 is a block diagram showing a hardware configuration for implementing the method according to an embodiment of the invention.

FIG. 2 shows a configuration of an embodiment of the periodic inspection data analysis apparatus (strategy evaluating apparatus) according to the present invention. As shown in FIG. 2, the periodic inspection data analysis apparatus includes a periodic inspection database 101, data maintenance strategy storage 102, degradation prediction model storage 103, evaluation maintenance strategy storage 104, base case example selector 105, virtual case example generator 106, evaluation case example selector 107, and maintenance strategy evaluator 108. These components can be each realized as a program module, for example, in which case the functions of the components can be realized by executing a program including the program modules in a computer system shown in FIG. 19. The computer system has a CPU 502 for executing program instructions, a main storage device 503 such as memory, an external storage device 504 such as a hard disk, magnetic disk device, or magneto-optical disk device, an input device 505 for a user to input data, a display device 506 for displaying data to the user, and a bus 501 connecting them to each other.

The periodic inspection database 101 maintains information on device IDs, times of inspection, device attributes representing operation characteristics of various devices, degradation level of the devices obtained in inspections. FIG. 8 shows an example of the periodic inspection database, where one record (or case example) corresponds to the result of one periodic inspection of one device. Included fields are device ID, the number of device activations, duration of device activation, time of an annual inspection (or inspection time information), a degradation level determined in an inspection, and a determination result (i.e., replacement information indicating whether the device should be replaced or not). One or more records are included per device; three records are included that have a device ID 1, for example. That is to say, the database shown in FIG. 8 accumulates, for each device, one or more case examples (second case examples) that include inspection time information which indicates an inspection for which of a plurality of periodic inspection times (i.e., one, two and three years after installation) has been performed, degradation level of the device, the operation characteristic of the device, and a determination result (i.e., replacement information).

Because the periodic inspection database shown in FIG. 8 accumulates complete inspection results from the first year to the time of replacement for all devices, it is possible to obtain information on case examples of devices which have been replaced by the time of evaluation. However, data on past periodic inspections might be lost due to update of an information system and the like. FIG. 7 shows an example of the periodic inspection database for such a case, which includes a field representing the year of device installation in place of the year of inspection. The database shown in FIG. 7 maintains only results of the periodic inspection in the year 2006, thus only case examples of devices which exist in 2006 are present. The inspection time of the devices can be estimated from their installation year and the time of a periodic inspection. For example, to pay attention to device degradation in the third year after installation (that is, the time of evaluation is set to the third year), attention should be directed to case examples having an installation year of 2003 (i.e., device IDs 1 to 3). Records of device IDs 1 to 3 represent data on devices for which an inspection for the periodic inspection time of three years after installation has been performed; records of device IDs 4 to 11 represent data on devices for which an inspection for the periodic inspection time of two years after installation has been performed; and records of device IDs 12 to 14 represent data on devices for which an inspection for the periodic inspection time of one year after installation has been performed. That is to say, the database shown in FIG. 7 accumulates, for each device, a plurality of case examples (first case examples) that include inspection time information which indicates an inspection at which of a plurality of periodic inspection times (i.e., one, two, and three years after installation) has been performed, degradation level of the device, the operation characteristic of the device, and the determination result (or replacement information).

Here, it is necessary to take into account that some of devices which were installed in the year 2003 may have been subjected to the second-year inspection and replaced in the periodic inspection in the year 2005. Similarly, it is necessary to take into account that some of devices that were installed in the year 2003 may have been subjected to the first-year inspection and replaced in the periodic inspection in the year 2004. In other words, in analysis of the periodic inspection database shown in FIG. 7, it is required to solve the problem of unavailability of information on case examples of devices that have been replaced. The present invention can address both of such a database shown in FIG. 7 and the database shown in FIG. 8.

The data maintenance strategy storage 102 stores a data maintenance strategy which has maintenance strategies implemented during collection of case examples to be contained the periodic inspection database 101 (FIGS. 7 and 8). FIG. 9 shows an example of a data maintenance strategy, which stores inspection time data which shows that three inspections, i.e., first, second and third-year inspections, have been performed since the year in which a device was started to be used, and replacement condition data which indicates that a device of a case example whose degradation level is 0.5 (a threshold value) or higher should be replaced. Inspection times are not required to be at regular intervals. Also, an inspection time may be a point of 10,000 or 20,000 km of driving for parts of an automobile, for example, instead of a time period. The threshold value in replacement condition data may be different from one inspection time to another. It is also possible to include data such as an inspection condition for checking only devices that meet a certain condition into a data maintenance strategy.

Figure 11:
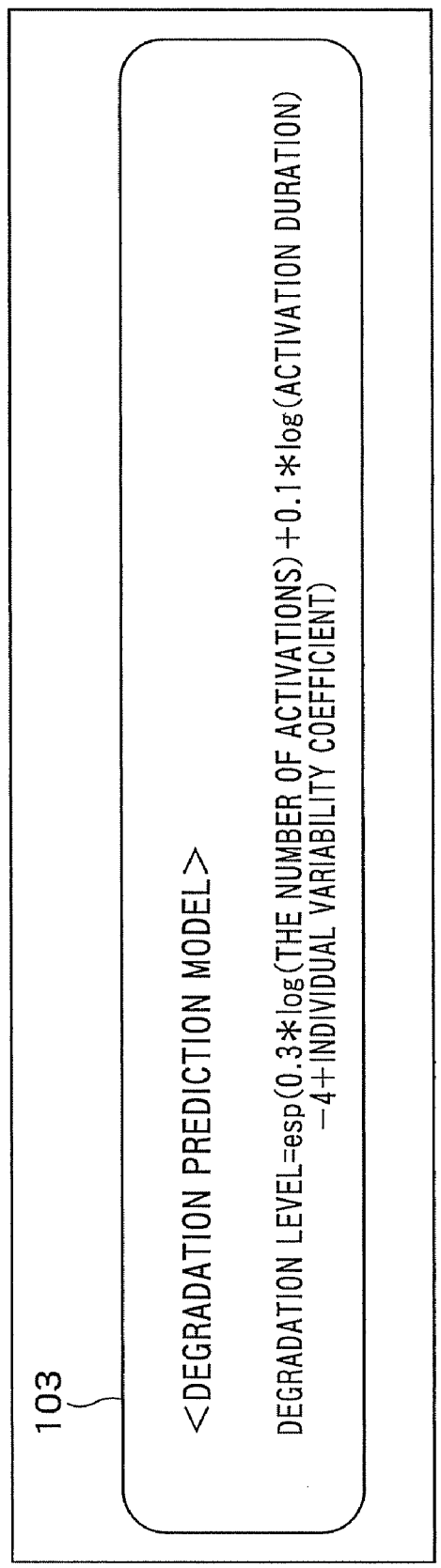
FIG. 11 shows an example of a degradation prediction model.

The degradation prediction model storage 103 stores degradation prediction models, which are probabilistic models for predicting the degradation level of a device from its operation characteristics. FIG. 11 shows an example of a degradation prediction model, illustrating a degradation prediction model for predicting a degradation level from attributes representing operation conditions, i.e., the number of device activations and duration of activation. Parameter learning for such a degradation prediction model as shown in FIG. 11 can also be performed with a prediction model building library from a commercially available statistical package by using case examples in the periodic inspection database 101 (one or both of the databases shown in FIGS. 7 and 8).

The evaluation maintenance strategy storage 104 stores a evaluation maintenance strategy, which is a maintenance strategy to be analyzed and a evaluation time that indicates device degradation at which time should be evaluated. FIG. 10 shows an example of an evaluation maintenance strategy, which includes evaluative inspection time data representing information that a periodic inspection is performed in the 2.5th year, which is not included in the inspection times shown in FIG. 9, evaluative replacement condition data which indicates that devices of case examples having a degradation level of 0.55 or higher should be replaced, which is different from the replacement condition shown in FIG. 9, and evaluation time data which indicates that device degradation in the third year after device installation should be analyzed.

That is, in the examples shown in FIGS. 9 and 10, analysis is made for device degradation at the point of three years after device installation when the maintenance strategy is applied: "a periodic inspection is performed only in the 2.5th year and devices whose degradation level is 0.55 or higher should be replaced", by use of a periodic inspection database which is obtained under the maintenance strategy: "a periodic inspection is performed in the first, second and third year and devices having a degradation level of 0.5 or higher should be replaced". If device degradation at the point of three years is analyzed completely ignoring difference in maintenance strategies, the average value of device degradation for the example shown in FIG. 7 is determined as follows, for example:

$$\text{Average}(\{0.50, 030, 0.35\}) \approx 0.38 \qquad \text{(Formula 1)}$$

That is, device that have been installed for three years at the point of the 2006 periodic inspection are devices that were installed in the year 2003 (i.e., devices with device IDs 1, 2 and 3), and the average of degradation levels of these devices is determined as Formula 1. Here, "Average(A)" represents a function for determining the average value of array "A". A general analysis performs such calculation as shown above and does not consider possible existence of devices that have been replaced in the periodic inspection in the first or second year after installation.

Figure 3:
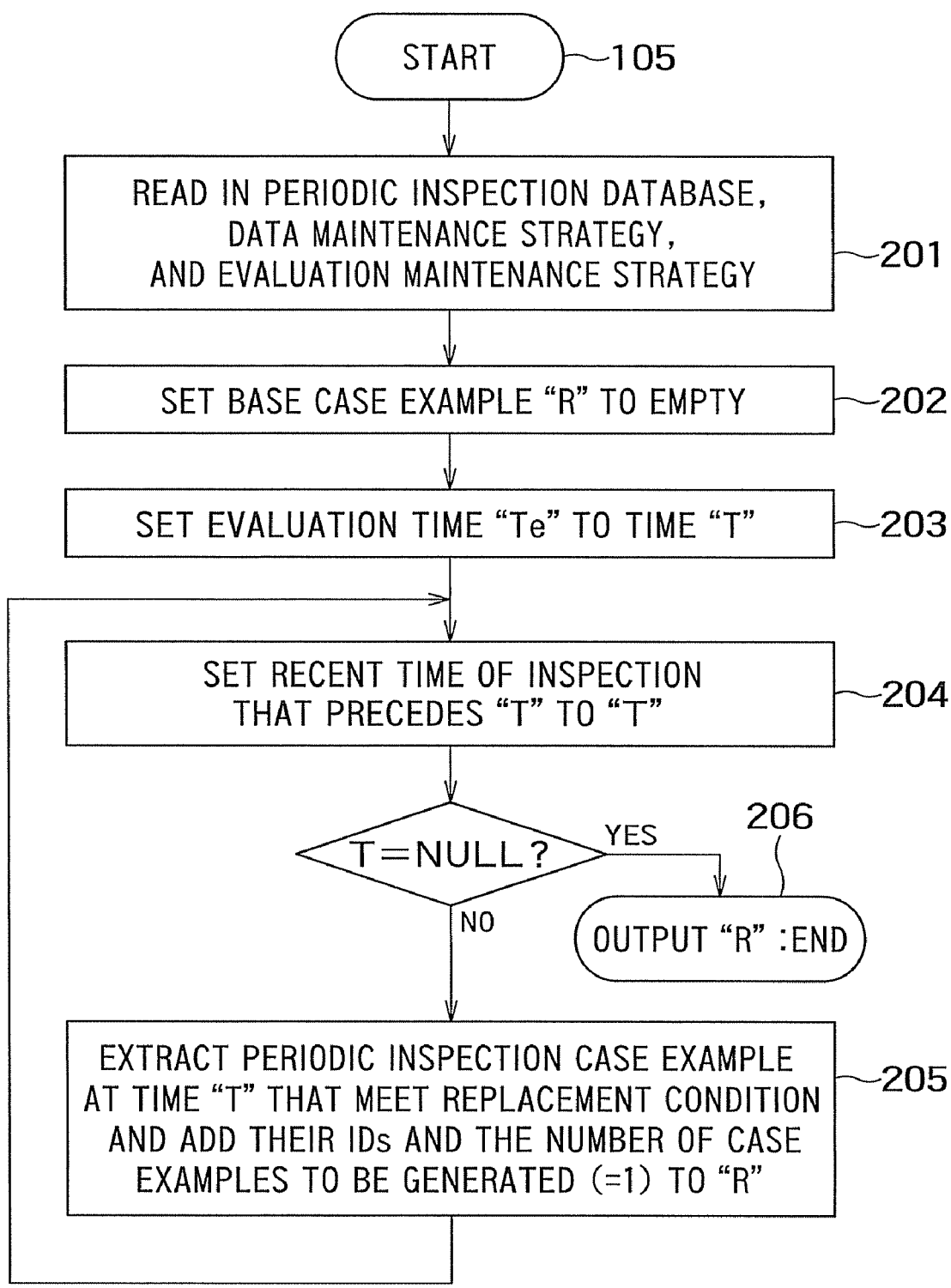
FIG. 3 shows a first flowchart for a base case example selector.
Figure 12:
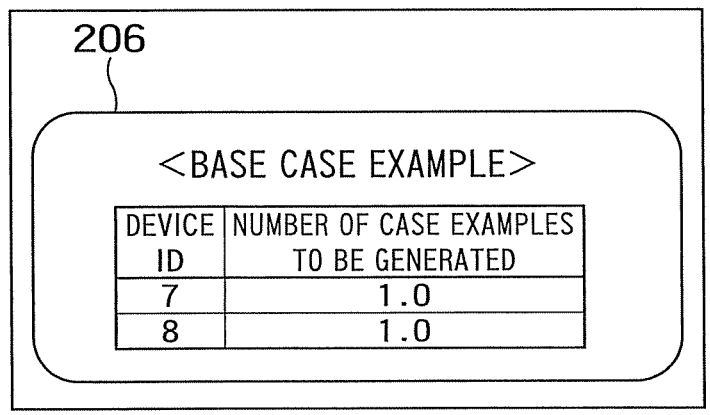
FIG. 12 shows first examples of base case examples.

The base case example selector 105 selects from the periodic inspection database 101 case examples that will be the basis for generating case examples of devices that have been replaced under the data maintenance strategy 102 (FIG. 9) as base case examples. FIG. 3 shows a flowchart representation of the procedure for selecting base case examples from a periodic inspection database that can obtain information on case examples of replaced devices, such as the one shown in FIG. 8. In FIG. 3, case examples that meet a replacement condition at one of all inspection times that precede the time of evaluation "Te" are selected and device IDs and the number of generated case examples count having a value of 1 are added to a base case example set "R", which is output at the end of processing. FIG. 12 shows an example of base case examples obtained from the periodic inspection data shown in FIG. 8, where case examples that meet a replacement condition at any of times preceding the time of evaluation "Te" (=the third year) i.e., {the second and first year}, are selected.

Figure 4:
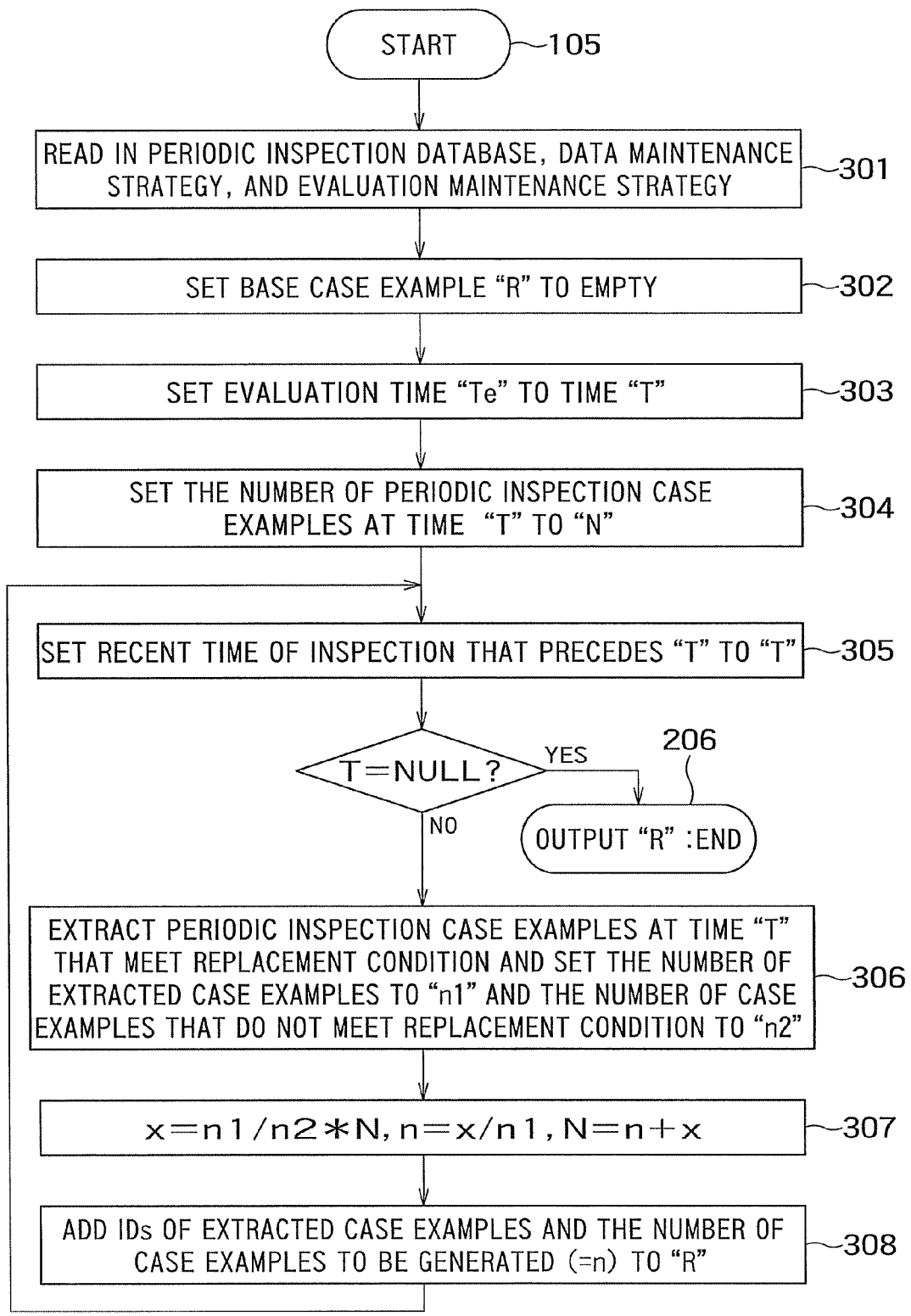
FIG. 4 shows a second flowchart for a base case example selector.

FIG. 4 shows a flowchart representation of the procedure for selecting base case examples from a periodic inspection database that cannot obtain information on case examples of replaced devices, such as the one shown in FIG. 7. In FIG. 4, case examples that meet a replacement condition at any of all inspection times that precede the time of evaluation "Te" are selected, and with respect to the number of inspection case examples "N" contained in the database at the time of evaluation "Te", the number of case examples to be generated is calculated based on the ratio of the number of case examples ("n1") that meet the replacement condition to the number of case examples ("n2") that do not meet the replacement condition. Then, device IDs and data on the number of case examples to be generated are added to the base case example set "R", which is output at the end of processing.

The execution process of the flowchart shown in FIG. 4 in the periodic inspection database shown in FIG. 7 will be described in detail:

1) Step 303: T=the third year
2) Step 304: N=3 (periodic inspection case examples for the third year)
3) Step 305 (the first round): T=the second year
4) Step 306 (the first round): extract case example of IDs 4 and 5 corresponding to the second-year inspection, n1=2, n2=6
5) Step 307 (the first round): x=n1/n2*N=2/6*3=1, n=x/n1=1/2=0.5, N=N+x=3+1=4
6) Step 308 (the first round): add case examples of IDs 4 and 5 to base case examples with the number of case examples to be generated "0.5"
7) Step 305 (the second round): T=the first year
8) Step 306 (the second round): extract case examples of ID 12 corresponding to the first-year inspection, n1=1, n2=2
9) Step 307 (the second round): x=n1/n2*N=1/2*4=2, n=x/n1=2/1=2, N=N+x=4+2=6
10) Step 308 (the second round): add case examples of ID 12 to base case examples with the number of case examples to be generated "2"

At 2), the number of case examples at the time of evaluation (=the third year) is saved as the reference number N=3. Here, while there are three device that have been installed for three years, if history of past replacement is not available, it is necessary to estimate how many of the devices that were installed three years ago have been subsequently replaced. Thus, time "T" is set to the second year at 3), and the number "n1" of devices which have been installed for two years and that exceed the replacement condition and the number "n2" of ones that do not exceed the condition are determined at 4). Provided that the devices that were installed three years ago have also been replaced in the past at the same rate, the estimated number "x" of devices that would have been replaced in the second year satisfies:

$$\frac{x}{N+x} = \frac{n1}{n1+n2}$$ (Formula 2)

Figure 13:
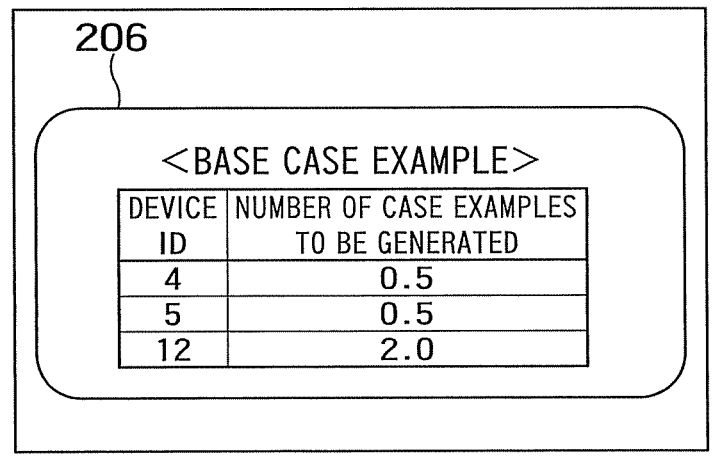
FIG. 13 shows second examples of base case examples.

Accordingly, the number "x" is estimated to be x=n1/n2*N. At 5), "x" is calculated to be x=2/6*3=1.0, and assuming that the number of third-year case examples is three, it can be estimated that one device had been replaced in the second year. However, even if the number can be determined, there is no way to find out devices with what kind of case example were replaced in the past. Thus, case examples in the database that represent the second-year inspection are used instead, so that case examples with IDs 4 and 5 are extracted at 4). Here, x virtual case examples should be generated from the n1 case examples extracted, so that the (required) number of generated virtual case examples per case example is x/n1 (=n). At 5), since x=1 and n1=2, "n" is calculated to be n=0.5, and device IDs 4 and 5 as well as the number of case examples to be generated "0.5" for each of the IDs are added to base case examples at 6). Calculation is performed in a similar way when time "T" is set to the first year (i.e., the second round), where it is estimated that two (=x) devices would have been replaced in the first year, and the (required) number of generated virtual case examples per case example (only ID 12) is calculated to be n=2 because x=2 and n1=1, and the device ID 12 and the number of case examples to be generated "2" are added to base case examples. FIG. 13 shows exemplary output of base case examples obtained from the periodic inspection data shown in FIG. 7, where three base case examples are selected and saved with the number of case examples to be generated. By performing such processing, it is possible to select base case examples even when information on case examples of replaced devices is not available.

Figure 5:
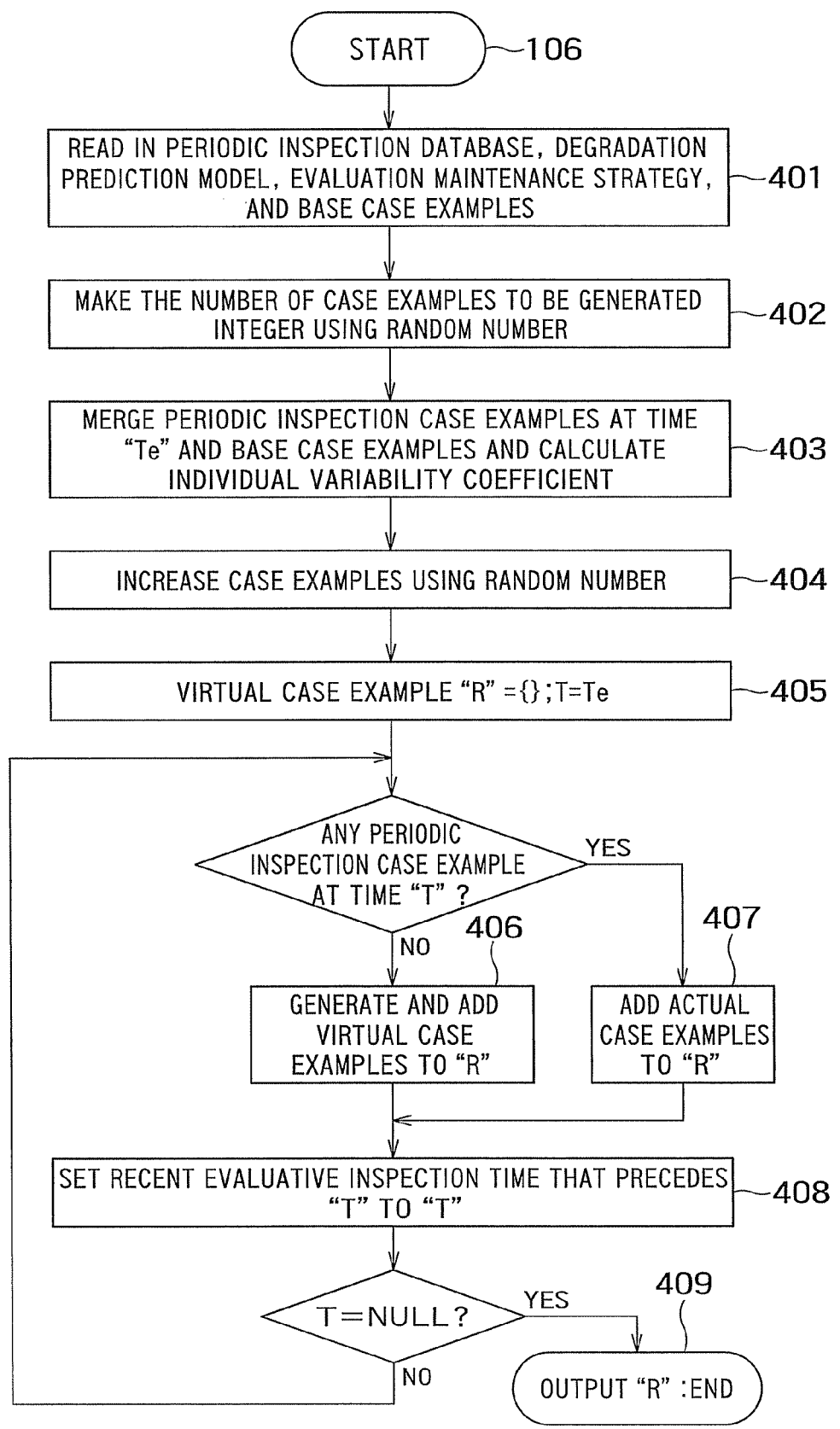
FIG. 5 shows a flowchart for a virtual case example generator.
Figure 14:
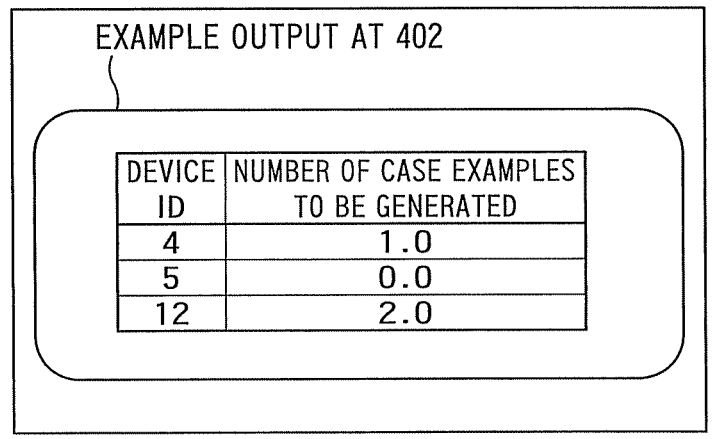
FIG. 14 shows an example of output at step 402 of FIG. 5.

The virtual case example generator 106 generates virtual case examples, which are case examples as estimation of device degradation at times (in this example, the 2.5th and third year) necessary for evaluating an evaluation maintenance strategy (FIG. 10), by using base case examples (FIGS. 12 and 13) and a degradation prediction model. FIG. 5 shows a flowchart representation of the procedure for generating virtual case examples. Although the following description will mainly discuss an example where information on case examples of replaced devices is not available (e.g., the case of the database shown in FIG. 7), similar processing can also address a case where such information is available (e.g., the case of the database shown in FIG. 8). After necessary information is read in at step 401 in FIG. 5, the number of case examples to be generated is made an integer using a random number at step 402. This step determines how many virtual case examples should be generated from which case example based on the number of case examples to be generated for a selected base case example. FIG. 14 shows exemplary output of the result of applying step 402 to the base case examples shown in FIG. 13. Since one virtual case example has to be generated from device IDs 4 and 5 in FIG. 13, either one of the IDs is selected with the probability of 0.5. In FIG. 14, device ID 4 is selected. It is also possible to generate one base case example through calculation of two base case examples for device IDs 4 and 5, instead of selecting a base case example. For example, operation characteristics of two base case examples may be averaged and an individual variability coefficient may be determined from the average value and a degradation prediction model. If the number of case examples to be generated is 1.5 for both the base case examples, for example, one of them is set to 2 and the other one is set to 1.

Also, if fractions occur in the total number of case examples to be generated, rounding-down or rounding-up (to the nearest integer) may be performed, for example.

Then, at step 403 of FIG. 5, periodic inspection case examples at the time of evaluation (=the third year) (i.e., case examples of devices for which an inspection for the third year after installation has been performed) and case examples of device IDs whose the number of case examples to be generated in base case examples is one or more are copied from the periodic inspection database. Then, a number attribute is given to the copied case examples. For a periodic inspection case example at the time of evaluation, the number of generated case example is one. Finally, an individual variability coefficient, which is a value representing deviation from the average degradation level of the degradation prediction model, is calculated for each case example and added as an attribute. FIG. 15 shows exemplary output at step 403 which is calculated based on the output result shown in FIG. 14. Case examples of IDs 1 to 3 which correspond to the periodic inspection at the time of evaluation (i.e., the third year) and case examples of IDs 4 and 12 which are base case examples whose number of case examples to be generated is one or more are copied from the periodic inspection database, and number attributes and the individual variability coefficient attributes are added to them. Here, the individual variability coefficient can be calculated using the degradation prediction model shown in FIG. 11. From the equation shown in FIG. 11, the relationship below holds:

individual variability coefficient=log(degradation level)−0.3*log(the number of activations)−0.1*log(duration of activation)+4  (Formula 3)

and therefore the individual variability coefficient is calculated from degradation level, the number of activations, and activation duration.

Then, at step 404 of FIG. 5, case examples whose number of case examples to be generated is two or more are increased using a random number. This is performed for preventing generation of identical virtual case examples. (The number of case examples to be generated −1) case examples are copied and a random number is added to the individual variability coefficient calculated at step 403, thereby causing variation in virtual case examples. FIG. 16 shows exemplary output at step 404 which is calculated based on the output result shown in FIG. 15. The case example of ID 12 which has the number of case examples to be generated of two has been increased to two case examples which are different only in individual variability coefficient, and added.

Subsequently, at steps 405 through 409 in FIG. 5, virtual case examples are generated for the evaluation time "Te" and all evaluative inspection times that precede the evaluation time. Here, if the result of inspecting a certain case example at time "T" is contained in the periodic inspection database, the result is used, otherwise, a virtual case example is generated by performing step 406 for virtual case example generation. FIG. 17 shows exemplary virtual case examples which are calculated based on the output result shown in FIG. 16. Virtual case examples have been generated for the evaluation time {the third year} and all evaluative inspection times that precede the evaluation time, i.e., {2.5th year}. The fourth and subsequent case examples from the top in FIG. 17 (i.e., case examples of the device ID 4 and subsequent IDs) are generated at step 406, which generates virtual case examples.

In generation of virtual case examples at time "T" for case example "I", processing below is performed:

1) predict the attribute of case example "I" at time "T"; and
2) predict a degradation level based on a degradation prediction model using the predicted attribute and an individual variability coefficient. For example, to predict the degradation level for the case example of device ID 4 at the point of the third year, prediction can be made as follows:
1) the number of activations in the third year: 500/2*3=750, and the duration of activation in the third year: 2200/2*=3300
2) exp(0.3*log(750)+0.1*log(3300)−4+0.67)≈0.59

If the value of attribute of case example "I" at time "T" is saved as data, it needs not be predicted and the value may be used.

While the description so far has discussed a case where information on case examples of replaced devices is not available, when the information is available, only steps 402 and 404 of FIG. 5 become unnecessary. By performing such processing as described above, it is possible to generate virtual case examples necessary for evaluation of an evaluation maintenance strategy by use of a probabilistic model, i.e., a degradation prediction model, while reflecting knowledge about degradation process of devices.

Figure 6:
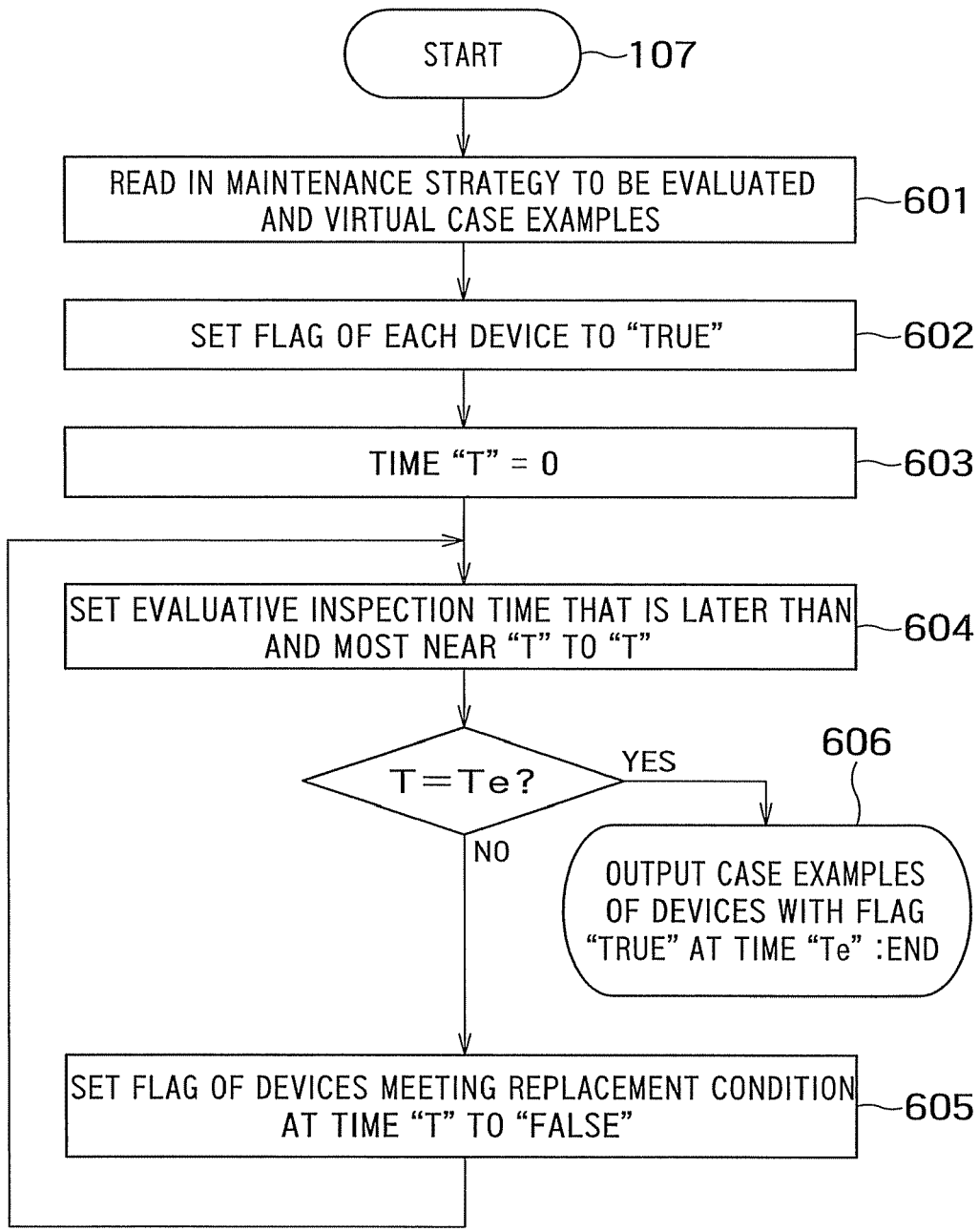
FIG. 6 shows a flowchart for an evaluation case example selector.

The evaluation case example selector 107 selects as evaluation case examples only case examples necessary for analyzing device degradation at the time of evaluation by using virtual case examples and an evaluation maintenance strategy. FIG. 6 shows a flowchart representation of the procedure for selecting evaluation case examples. In FIG. 6, the flag of only devices that do not meet evaluative replacement conditions at any of all evaluative inspection times that precede the time of evaluation are set to "true" and only case examples of devices with the flag set to "true" at the time of evaluation are selected, thereby generating evaluation case examples. FIG. 18 shows exemplary evaluation case examples which are generated using the virtual case examples shown in FIG. 17. In FIG. 18, the flag of devices that exceed an evaluation replacement criterion of 0.55 at the evaluative inspection time of 2.5th year (i.e., 12-a and 12-b) is set to "false" and only case examples of device IDs 1 to 4 at the point of the third year are selected. By performing such processing, it is possible to obtain data for analyzing device degradation at the time of evaluation under a maintenance strategy which is not actually implemented. The procedure for evaluation case example selection shown in FIG. 6 can be similarly used in a case where information on case examples of replaced devices can be obtained.

Consider analysis of device degradation three years after device installation when the evaluation maintenance strategy of FIG. 10 is adopted using the data shown in FIG. 18. For example, the average value of device degradation is determined as:

Average({0.50, 0.30, 0.35, 0.59})≈0.44  (Formula 4)

which confirms that the degradation level is high as compared to Formula 1 which makes analysis ignoring case examples of replaced devise. That is, if analysis is made not considering replaced case examples, device degradation will be underestimated. On the other hand, analysis that considers replaced case examples as the present invention can realize maintenance strategy evaluation of higher safety.

As another example of maintenance strategy evaluation, assume a normal distribution using an average value "m" determined with Formula 4 and a standard deviation "δ" determined with Formula 5:

Stddev({0.50, 0.30, 0.35, 0.59})≈0.133  (Formula 5)

For example, the probability that a failure criterion of 1.0 is exceeded can be calculated with Formula 6, which results in $1.27*10^{-5}$. Here, "Stddev(A)" represents a function for calculating the standard deviation of array "A", and "norm(x, m, δ)" represents a probability density function for a value "x" in a normal distribution with the average value "m" and the standard deviation "δ".

$$\int_{1.0}^{\infty} norm(x, 0.44, 0.133) dx \qquad \text{(Formula 6)}$$

As has been described above, according to the present embodiment, it is possible to evaluate a maintenance strategy which is different from a maintenance strategy which was implemented at the time of data collection in consideration of case examples of replaced devices.

What is claimed is:

1. A data analysis apparatus for evaluating a maintenance strategy for a plurality of devices, comprising:

a database configured to store first case examples of the devices, each including
    inspection time information which indicates an inspection for which of a plurality of periodic inspection times has been performed,
    a degradation level of the device,
    operation characteristics of the device, and
    replacement information indicating whether the device should be replaced or not;

a maintenance strategy storage configured to store a evaluation maintenance strategy including
    an evaluative inspection time which indicates a time at which a periodic inspection should be conducted instead of the plurality of periodic inspection times,
    an evaluation time indicating a time at which degradation of the devices is to be evaluated and which is later than the evaluative inspection time, in a case that the periodic inspection is conducted at the evaluative inspection time instead of the plurality of periodic inspection times, and
    a replacement condition indicating a condition for replacing the device based on the degradation level of the device;

a degradation prediction model storage configured to store a degradation prediction model for predicting the degradation level of the device from the operation characteristics of the device;

a base case example selector configured to select base case examples which are first case examples whose periodic inspection time precedes the evaluation time and having the replacement information indicating that the replacement should be conducted;

a case example generation and selection unit configured to
    estimate by using the database an estimated number of devices that have already been replaced before the evaluation time to not exist in the database, obtain the degradation level at the evaluative inspection time of each of as many devices as the estimated number by using at least the former of the base case examples and the degradation prediction model, and generate first virtual case examples including the degradation level at the evaluation time of devices whose obtained degradation level at the evaluative inspection time does not meet the replacement condition based on the base case examples and the degradation prediction model,
    calculate the degradation level at the evaluative inspection time of devices whose first case example have same periodic inspection time as the evaluation time from the first case examples of those devices and the degradation prediction model, and select first case examples of devices whose degradation level at the evaluative inspection time does not meet the replacement condition; and an evaluator configured to evaluate the evaluation maintenance strategy by using generated first virtual case examples and selected first case examples.

2. The apparatus according to claim 1, wherein the case example generation and selection unit
    separates the base case examples into groups each of which has same inspection time information,
    estimates for each of the groups the number of devices that have been replaced in an inspection at the same periodic inspection time as that of the group based on a ratio of the number of base case examples included in the group and the number of first case examples that have the same inspection time information as that of the group and have replacement information indicating that the replacement should not be conducted, and
    obtains for each of the groups the degradation level at the evaluative inspection time of each of as many devices as estimated number using at least the former of individual base case examples in the group and the degradation prediction model, and generates first virtual case examples including the degradation level at the evaluation time for devices whose degradation level at the evaluative inspection time does not meet the replacement condition based on the base case examples in the group and the degradation prediction model.

3. The apparatus according to claim 2, wherein the degradation prediction model has an individual variability coefficient representing deviation from an average degradation level and the operation characteristics of the device, as parameters, the case example generation and selection unit
    calculates the individual variability coefficient for each base case example in each group by utilizing the degradation prediction model,
    when the number of base case examples contained in the each group is less than the number of devices that have been replaced in an inspection at the same periodic inspection time as that of the group, generates as many copies of any base case example contained in the group as a difference in number,
    when the periodic inspection time of group is different from the evaluative inspection time,
        calculates the individual variability coefficients for the base case examples obtained by copying by use of the individual variability coefficients for copied base case examples in the group and a random number,
        estimates operation characteristics at the evaluative inspection time from each of the base case examples and each of base case examples obtained by copying, and
        calculates the degradation level at the evaluative inspection time from estimated operation characteristics, the individual variability coefficient, and the degradation prediction model for each of the base case examples and each of base case examples obtained by copying, and
    when the periodic inspection time of the group is the same as the evaluative inspection time, obtains a degradation level contained in each of the base case examples and base case examples obtained by copying as the degradation level at the evaluative inspection time.

4. The apparatus according to claim 2, wherein
the degradation prediction model has an individual variability coefficient representing deviation from an average degradation level and the operation characteristics of the device, as parameters,
the case example generation and selection unit
calculates the individual variability coefficient for each base case example in the each group by utilizing the degradation prediction model, and
when the number of base case examples contained in each group is greater than the number of devices that have been replaced in an inspection at the same periodic inspection time as that of the group, selects as many base case examples as the number of devices from each group,
when the periodic inspection time of group is different from the evaluative inspection time, estimates operation characteristics at the evaluative inspection time from each selected base case example, and calculates the degradation level at the evaluative inspection time from estimated operation characteristics, the individual variability coefficient, and the degradation prediction model for each selected base case example, and
when the periodic inspection time of the group is the same as the evaluative inspection time, obtains a degradation level contained in each selected base case example as the degradation level at the evaluative inspection time.

5. The apparatus according to claim 2, wherein
the degradation prediction model has an individual variability coefficient representing deviation from an average degradation level and the operation characteristics of the device, as parameters,
the case example generation and selection unit
calculates the individual variability coefficient for each base case example in each group by utilizing the degradation prediction model,
when the number of base case examples contained in each group is greater than the number of devices that have been replaced in an inspection at the same periodic inspection time as that of the group, selects two or more base case examples for at least one replaced device, and selects for each of remaining replaced devices from base case examples other than the two or more base case examples, and generates a base case example for the at least one device by using the two or more base case examples,
when the periodic inspection time of the group is different from the evaluative inspection time, calculates the individual variability coefficient for the generated base case example by using the degradation prediction model, estimates operation characteristics at the evaluative inspection time from each selected base case example and the generated base case example, and calculates the degradation level at the evaluative inspection time from estimated operation characteristics, the individual variability coefficient, and the degradation prediction model for each of the selected base case examples and the generated base case example, and
when the periodic inspection time of the group is the same as the evaluative inspection time, obtains a degradation level contained in each selected base case example and the generated base case example as the degradation level at the evaluative inspection time.

6. The apparatus according to claim 1, wherein the case example generation and selection unit calculates the operation characteristics of devices which have inspection time information indicating the same periodic inspection time as the evaluation time from the first case examples of the devices, calculates a degradation level from calculated operation characteristics and the degradation prediction model for each device, and selects the first case examples of devices whose degradation level calculated does not meet the replacement condition.

7. The apparatus according to claim 1, wherein the evaluator calculates an average degradation level by using the generated first virtual case examples and the selected first case examples.

8. The apparatus according to claim 1, wherein the evaluator calculates a probability distribution of degradation levels by using the generated first virtual case examples and the selected first case examples, and calculates a probability that the degradation level is a predetermined value or higher from the probability distribution.

9. A data analysis apparatus for evaluating a maintenance strategy for a plurality of devices, comprising:
a database configured to store one or more second case examples of each of the devices, each including
inspection time information which indicates an inspection for which of a plurality of periodic inspection times has been performed,
a degradation level of the device,
operation characteristics of the device, and
replacement information indicating whether the device should be replaced or not;
a maintenance strategy storage configured to store a evaluation maintenance strategy including
an evaluative inspection time which indicates a time at which a periodic inspection should be conducted instead of the plurality of periodic inspection times,
an evaluation time indicating a time at which degradation of the devices is to be evaluated and which is later than the evaluative inspection time, in a case that the periodic inspection is conducted at the evaluative inspection time instead of the plurality of periodic inspection times, and
a replacement condition indicating a condition for replacing the device based on the degradation level of the device;
a degradation prediction model storage configured to store a degradation prediction model for predicting the degradation level of the device from the operation characteristics of the device;
a case example generation and selection unit configured to
obtain the degradation level at the evaluative inspection time for each device whose second case example has a periodic inspection time which precedes the evaluation time and having replacement information indicating that the replacement should be conducted, by using at least the former of the second case example of each device and the degradation prediction model, and generate second virtual case examples each including the degradation level at the evaluation time for the device whose obtained degradation level at the evaluative inspection time does not meet the replacement condition based on the second case example of the device and the degradation prediction model,
calculate the degradation level at the evaluative inspection time for each device that have same periodic inspection time as the evaluation time by using at least former of the second case example of the devices and the degradation prediction model, and select the second case example having same periodic inspection time as the evaluation time from among second case examples of each device whose calculated degradation level at the evaluative inspection time does not meet the replacement condition; and an evaluator configured to evaluate the evaluation maintenance strategy by using generated second virtual case examples and selected second case examples.

10. The apparatus according to claim 9, wherein the evaluator calculates an average degradation level by using the generated second virtual case examples and the selected second case examples.

11. The apparatus according to claim 10, wherein the evaluator calculates a probability distribution of degradation levels by using the generated second virtual case examples and the selected second case examples, and calculates a probability that the degradation level is a predetermined value or higher from calculated probability distribution.

12. A data analysis method, comprising:

providing a database configured to store for each of a plurality of devices a first case example that includes
   inspection time information which indicates an inspection for which of a plurality of periodic inspection times has been performed,
   a degradation level of the device,
   operation characteristics of the device, and
   replacement information indicating whether the device should be replaced or not;

providing a evaluation maintenance strategy including
   an evaluative inspection time which indicates a time at which a periodic inspection should be conducted instead of the plurality of periodic inspection times,
   an evaluation time indicating a time at which degradation of the devices is to be evaluated and which is later than the evaluative inspection time, in a case that the periodic inspection is conducted at the evaluative inspection time instead of the plurality of periodic inspection times, and
   a replacement condition indicating a condition for replacing the device based on the degradation level of the device;

providing a degradation prediction model for predicting the degradation level of the device from the operation characteristics of the device;

selecting base case examples which are first case examples whose periodic inspection time precedes the evaluation time and having the replacement information indicating that the replacement should be conducted;

estimating by using the database an estimated number of devices that have already been replaced before the evaluation time to not exist in the database, obtain the degradation level at the evaluative inspection time of each of as many devices as the estimated number by using at least the former of the base case examples and the degradation prediction model, and generate first virtual case examples including the degradation level at the evaluation time of devices whose obtained degradation level at the evaluative inspection time does not meet the replacement condition based on the base case examples and the degradation prediction model, calculating the degradation level at the evaluative inspection time of devices whose first case example have same periodic inspection time as the evaluation time from the first case examples of those devices and the degradation prediction model, and select first case examples of devices whose degradation level at the evaluative inspection time does not meet the replacement condition; and evaluating configured to evaluate the evaluation maintenance strategy by using generated first virtual case examples and selected first case examples.

13. A data analysis method, comprising:

providing a database configured to store for each of a plurality of devices one or more second case examples each including
   inspection time information which indicates an inspection for which of a plurality of periodic inspection times has been performed,
   a degradation level of the device,
   operation characteristics of the device, and
   replacement information indicating whether the device should be replaced or not;

providing a evaluation maintenance strategy including
   an evaluative inspection time which indicates a time at which a periodic inspection should be conducted instead of the plurality of periodic inspection times,
   an evaluation time indicating a time at which degradation of the devices is to be evaluated and which is later than the evaluative inspection time, in a case that the periodic inspection is conducted at the evaluative inspection time instead of the plurality of periodic inspection times, and
   a replacement condition indicating a condition for replacing the device based on the degradation level of the device;

providing a degradation prediction model for predicting the degradation level of the device from the operation characteristics of the device;

obtaining the degradation level at the evaluative inspection time for each device whose second case example has a periodic inspection time which precedes the evaluation time and having replacement information indicating that the replacement should be conducted, by using at least the former of the second case example of each device and the degradation prediction model, and generating second virtual case examples each including the degradation level at the evaluation time for the device whose obtained degradation level at the evaluative inspection time does not meet the replacement condition based on the second case example of the device and the degradation prediction model, calculating the degradation level at the evaluative inspection time for each device that have same periodic inspection time as the evaluation time by using at least former of the second case example of the devices and the degradation prediction model, and selecting the second case example having same periodic inspection time as the evaluation time from among second case examples of each device whose calculated degradation level at the evaluative inspection time does not meet the replacement condition; and evaluating the evaluation maintenance strategy by using generated second virtual case examples and selected second case examples.

* * * * *